March 15, 1949.   V. R. HARSHMAN   2,464,309
FISHING FLOAT
Filed June 23, 1945

INVENTOR.
VIRGIL R. HARSHMAN.
BY Oltsch & Knoblock
ATTORNEYS.

Patented Mar. 15, 1949

2,464,309

UNITED STATES PATENT OFFICE 2,464,309

FISHING FLOAT

Virgil R. Harshman, South Bend, Ind.

Application June 23, 1945, Serial No. 601,219

7 Claims. (Cl. 43—17)

This invention relates to improvements in fishing floats. More particularly, the invention relates to a bobber or floating telltale so connected to a line as to be moved when a fish is caught, which movement signals the fisherman that he has a strike.

The primary object of this invention is to provide a fishing float of this character which contains illumination means operative only when the device is moved to a predetermined position different from its normal floating position.

A further object is to provide a device of this character having a hollow translucent body housing illuminating means and controlled by switch means responsive to the position of the body.

A further object is to provide a device of this character having a hollow translucent body and novel means for supporting illuminating means in the body in desired position and yieldingly to avoid damage upon impact.

A further object is to provide a device of this character including a translucent housing, illuminating means, and novel means for controlling said illuminating means.

Other objects will be apparent from the description, drawing and appended claims.

Figure 3:
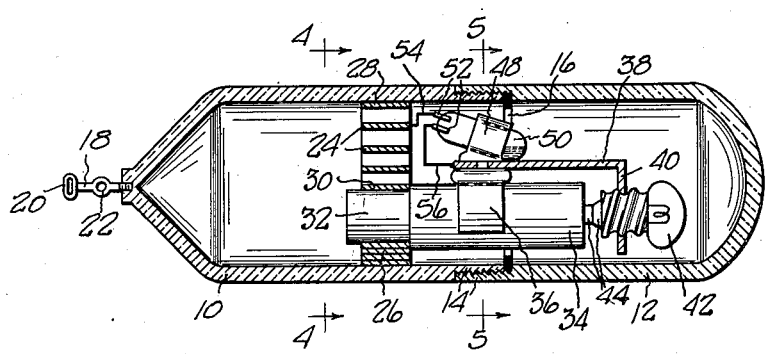
Fig. 3 is a longitudinal sectional view of the device taken on line 3—3 of Fig. 4, with parts shown in elevation.
Figure 4:
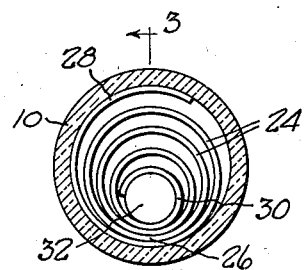
Fig. 4 is a transverse sectional view of the device taken on line 4—4 of Fig. 3.
Figure 5:
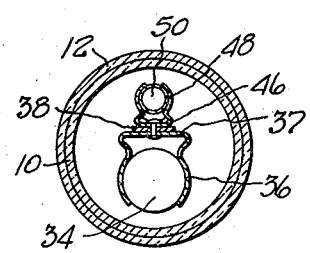
Fig. 5 is a transverse sectional view taken on line 5—5 of Fig. 3.

Referring to the drawing, which illustrates the referred embodiment of the invention, the numeral 10 designates one part, and the numeral 12 the other part of a hollow translucent body which is preferably formed of plastic material, such as cellulose acetate. It will be understood, however, that any translucent material may be employed, and that while the material should be either substantially non-hydroscopic or non-absorptive, it may also be made of material adapted for treatment by protective material such as lacquer or the like to render it non-hygroscopic. The body parts are substantially cup-shaped and have mating threaded end portions 14 to connect them detachably as a unit. A gasket 16 may be provided at the joint between threaded parts 14 to seal the joint and render the body water-tight.

A line attaching member 18 is secured to and projects centrally from the end of body part 10. Member 18 may be of any suitable construction and preferably includes a head 20 spaced outwardly from the line attaching eyelet 22 formed therein.

A spring 24 is coiled within the body part 10. Spring 24 is preferably formed of a fairly wide strip of metal bent to provide a plurality of eccentric convolutions lying in a plane transverse of the body. The eccentric convolutions are preferably in engagement with each other at radius 26 of the body. The outer spring convolution 28 is of a radius or size larger than the cavity so that it is under compression and thus has a firm positioning fit of large area within the body. The inner convolution 30 is of a diameter slightly smaller than the diameter of the bared end 32 of an elongated electric battery or dry cell 34 and fits constrictively therearound. The battery is thus held firmly in good electrical contact by the spring and is in desired position longitudinally and off-center with respect to the body so that the battery forms a keel or positioning weight in the device.

In longitudinally spaced relation to the spring 24, preferably near the parting plane of the body, is located a spring clip 36 fastened to and gripping the central insulated portion of the battery. The spring clip 36 preferably has a flat outwardly off-set central portion 37 which is positioned above the battery and substantially horizontally in the normal floating position of the device. One end of an elongated bracket 38 extending substantially parallel to and spaced from the battery is fixedly connected to the off-set 37 of the clip. The opposite end of the bracket 38 is bent perpendicularly therefrom at 40 in spaced relation to the end of the battery. Bracket portion 40 has an aperture therein axially aligned with the battery into which the stem of an electric lamp or bulb 42 is screw threaded for contact with the terminal of the battery at 44.

A second spring clip comprising a flat central base portion 46 and curved resilient gripping arms 48 is fixedly secured to the clip 34. The axis of the gripping arms 48 extends lengthwise of the float body but at an angle to the axis thereof in an upwardly tilted direction. A mercury tilt switch 50 is clamped between arms 48. Switch 50 has an elongated sealed envelope mounting a pair of spaced terminals 52 at its upper end and a body of mercury adapted to shift to the lowermost portion of said envelope. A lead 54 connects one switch terminal 52 with spring 24 and a second lead 56 connects the other switch terminal with brackets 38—40.

Figure 1:
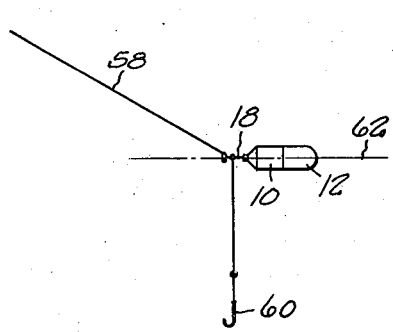
Fig. 1 is a diagrammatic view illustrating the use of the device.

In the use of the device it is attached to a fishing line 58 at member 18 thereof and at any desired distance from the hook 60 on the end of the line. In normal usage the device serves thus to control the depth to which the hook sinks in the water as is conventional in the use of fishing bobbers. Since the member is buoyant it floats on the surface of the water designated by line 62 in Figs. 1 and 2. It will be observed that since the device is attached to line 58 at only one end thereof, i. e. at member 18, the body is free to assume a normal horizontal position in the water, assuming that the center of mass of the battery 34, spring 24 and the other parts housed therein is located centrally of the length of the body. As mentioned before, the battery serves as a keel to prevent rotation of the device in the water. This insures positioning of the switch 50 above the battery and tilted upwardly with the end mounting the terminals 52 positioned uppermost. Consequently, the switch 50 is in open circuit position when the device floats normally.

Figure 2:
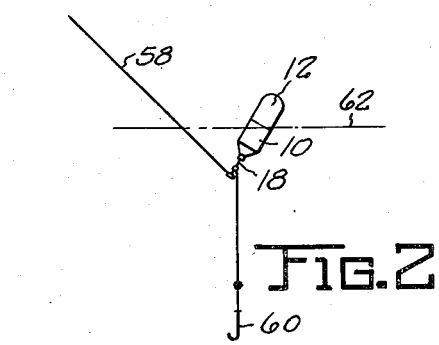
Fig. 2 is a diagrammatic view illustrating the actuated position of the device in use.

When a fish strikes the hook 60 and pulls upon line 58, the device tilts as shown in Fig. 2. When the angle of tilt exceeds the angular displacement of switch 50 relative to the axis of the float body, so that the end of the switch mounting terminals 52 is positioned lowermost, the mercury in the switch shifts and spans or immerses the inner portions of said terminals. In this tilted position the following circuit is closed and energized; lead 54, spring 24, battery 34, bulb 42, bracket 38—40, lead 56 and the closed switch 50, i. e. terminals 52 and the mercury spanning them. This results in energization of the bulb 42 which casts light rays through the transparent body member 10—12.

Among the advantages of the device is the fact that the two sections of the hollow float body are connected removably so that access is readily had to the illuminating device for repair or replacement of parts, but the device fully sealed against leakage of water therein. Also, the mounting of the illuminating means as a unit solely from spring 24 facilitates assembly. Likewise this spring mounting provides resilience which reduces the danger of damage to the illuminating means as a result of impact against obstructions or of rough handling. Another important feature of the device is that the illuminating means is always deenergized until after a fish has been hooked, so that the device does not lure fish thereto because of illumination thereof and hence does not violate game laws which prevent the use of illuminated fishing lures.

I claim:

1. A fishing float comprising a translucent body having a cavity, means at one end of said body for attachment to a fishing line, electrical illuminating means in said cavity, a resilient member mounting said illuminating means, means responsive to the angular position of said body for controlling said illuminating means, said resilient member constituting a coil spring having an eccentric inner convolution gripping at least a part of said illuminating means to position said means with its center of mass below the center of gravity of the body, said spring fitting expansibly in said cavity, and means connecting said responsive means to the coil spring to provide a current flowing medium between the illuminating means and the responsive means.

2. A fishing float comprising a hollow translucent body, line attaching means secured to said body, a coil spring confined in said body, a battery carried by and electrically connected with said spring, a bracket carried by said battery, a lamp carried by said bracket in contact with said battery, and a tilt switch carried by said bracket and responsive to the position of said body, and leads from said switch to said spring and said bracket to complete an electrical circuit.

3. A fishing float comprising a hollow translucent body, line attaching means secured to said body, a coil spring confined in said body, a battery carried by and electrically connected with said spring, a bracket carried by said battery, a lamp carried by said bracket in contact with said battery, and a tilt switch carried by said bracket and responsive to the position of said body, and leads from said switch to said spring and said bracket to complete an electrical circuit, said tilt switch comprising a mercury switch having an elongated envelope tilted relative to the normal horizontal plane of said body and terminals at its upper end.

4. A fishing float comprising a hollow translucent body, line attaching means secured to said body, a coil spring confined in said body, a battery carried by and electrically connected with said spring, a bracket carried by said battery, a lamp carried by said bracket in contact with said battery, and a tilt switch carried by said bracket and responsive to the position of said body, and leads from said switch to said spring and said bracket to complete an electrical circuit, said spring supporting said battery eccentrically of said body and centrally below the center of gravity thereof.

5. A fishing float comprising a separable two-part hollow translucent sealed body, line attaching means secured to said body, illuminating means constituting a battery, a lamp bulb, and a switch, means connecting said parts in operative relation as a unit, and a coil spring fitting expansibly in one part of said body and detachably mounting said unit, said switch being responsive to the position of said body and connected in circuit with said battery and bulb.

6. A fishing float comprising a separable two-part hollow translucent sealed body, line attaching means secured to said body, illuminating means constituting a battery, a lamp bulb, and a switch, means connecting said parts in operative relation as a unit, and a coil spring fitting expansibly in one part of said body and detachably mounting said unit, said switch being responsive to the position of said body and connected in circuit with said battery and bulb, said body being elongated and mounting line attaching means at one end.

7. A fishing float comprising a separable two-part hollow translucent sealed body, line attaching means secured to said body, illuminating means constituting a battery, a lamp bulb, and a switch, means connecting said parts in operative relation as a unit, and a coil spring fitting expansibly in one part of said body and detachably mounting said unit, said switch being responsive to the position of said body and connected in circuit with said battery and bulb, said body being elongated and mounting line attaching means at one end, said unit being removably mounted in said body at the longitudinal center of said body with its center of gravity laterally off-set from the axis of said body.

VIRGIL R. HARSHMAN.

(References on following page)

REFERENCES CITED

The following references are of record in the file of this patent:

UNITED STATES PATENTS

| Number | Name | Date |
|---|---|---|
| 1,529,459 | Wunderlin | Mar. 10, 1925 |
| 1,726,736 | Good | Sept. 3, 1929 |
| 1,823,937 | Hatchett | Sept. 22, 1931 |
| 1,982,609 | Freeze | Nov. 27, 1934 |
| 2,127,761 | Beck | Aug. 23, 1938 |
| 2,190,791 | Larson | Feb. 20, 1940 |
| 2,205,352 | Fisher | June 18, 1940 |
| 2,252,358 | Tosi | Aug. 12, 1941 |
| 2,280,457 | Sutcliffe | Apr. 21, 1942 |